(12) United States Patent
Vallance et al.

(10) Patent No.: US 12,345,923 B2
(45) Date of Patent: Jul. 1, 2025

(54) METALLIZED OPTICAL FIBER ARRAY MODULE AND FABRICATION METHOD THEREOF

(71) Applicant: Senko Advanced Components, Inc., Hudson, MA (US)

(72) Inventors: Robert Ryan Vallance, Newbury Park, CA (US); Yang Chen, Thousand Oaks, CA (US)

(73) Assignee: Senko Advanced Components, Inc., Hudson, MA (US)

( * ) Notice: Subject to any disclaimer, the term of this patent is extended or adjusted under 35 U.S.C. 154(b) by 150 days.

(21) Appl. No.: 17/969,543

(22) Filed: Oct. 19, 2022

(65) Prior Publication Data

US 2023/0123751 A1 Apr. 20, 2023

Related U.S. Application Data

(60) Provisional application No. 63/257,978, filed on Oct. 20, 2021.

(51) Int. Cl.
  *G02B 6/36* (2006.01)
  *G02B 6/42* (2006.01)

(52) U.S. Cl.
  CPC ......... *G02B 6/3652* (2013.01); *G02B 6/3636* (2013.01); *G02B 6/423* (2013.01)

(58) Field of Classification Search
  CPC ... G02B 6/3616; G02B 6/3636; G02B 6/3652
  See application file for complete search history.

(56) References Cited

U.S. PATENT DOCUMENTS

| | | | |
|---|---|---|---|
| 4,046,454 A * | 9/1977 | Pugh, III | G02B 6/3676 385/59 |
| 5,061,035 A | 10/1991 | Rogers | |
| 5,323,481 A * | 6/1994 | Tokumaru | G02B 6/2551 385/136 |
| 5,415,730 A | 5/1995 | Canning | |
| 5,889,914 A * | 3/1999 | Gentsu | G02B 6/3861 385/71 |
| 5,896,481 A | 4/1999 | Beranek | |
| 6,219,484 B1 | 4/2001 | Rhee | |
| 6,324,323 B1 * | 11/2001 | Benham | G02B 6/3652 385/52 |
| 6,402,394 B1 | 6/2002 | Heinrich | |
| 6,464,407 B1 * | 10/2002 | Ngo | G02B 6/3839 385/83 |

(Continued)

FOREIGN PATENT DOCUMENTS

DE 3443693 A1 * 5/1986
JP 3793564 B 4/2006

*Primary Examiner* — Michael Stahl

(57) ABSTRACT

An optical fiber array module that can accommodate variations in diameters of the optical fibers in the fiber array within anticipated tolerance, to accurately and securely retain the optical fibers in grooves in the module without using any solder interface or epoxy interface between the optical fibers and the supporting components. The fiber array module of the present invention relies on elasto-plastic interfaces for mechanical deformation, as opposed to solder reflow or epoxy curing, to accommodate variations in diameters of the optical fibers in the fiber array as supported in grooves between a substrate and a cover.

20 Claims, 5 Drawing Sheets

(56) References Cited

U.S. PATENT DOCUMENTS

| | | |
|---|---|---|
| 6,627,008 B1 | 9/2003 | Taniguchi |
| 6,742,937 B2 * | 6/2004 | Lee .................... G02B 6/3839 385/137 |
| 6,754,427 B2 | 6/2004 | Steinberg |
| 6,819,858 B2 | 11/2004 | Steinberg |
| 7,311,449 B2 | 12/2007 | Barnoski |
| 7,343,770 B2 | 3/2008 | Barnoski |
| 7,373,053 B2 | 5/2008 | Takahashi |
| 8,861,920 B2 | 10/2014 | Sato |
| 8,961,034 B2 | 2/2015 | Li |
| 9,897,769 B2 | 2/2018 | Li |
| 11,022,755 B2 | 6/2021 | Yang |
| 2003/0194197 A1 | 10/2003 | Chiang |
| 2006/0159402 A1 * | 7/2006 | Ammer ................ G02B 6/3809 385/71 |
| 2018/0372960 A1 * | 12/2018 | Wohlfeil ................ G02B 6/30 |
| 2021/0055490 A1 * | 2/2021 | Bennett ................ G02B 6/368 |

\* cited by examiner

METALLIZED OPTICAL FIBER ARRAY MODULE AND FABRICATION METHOD THEREOF

PRIORITY CLAIM

This application claims the priorities of U.S. Provisional Patent Application No. 63/257,978 filed on Oct. 20, 2021. This application is fully incorporated by reference as if fully set forth herein. All publications noted below are fully incorporated by reference as if fully set forth herein.

BACKGROUND OF THE INVENTION

1. Field of the Invention

The present invention relates to terminating the ends of optical fiber cables, particularly optical fiber array modules, and more particularly to a metallized optical fiber array module.

2. Description of Related Art

Conventional optical fiber array modules are generally in the form of a glass, silicon, or polymer substrate provided with an array of V-grooves for supporting the end sections of an array of optical fibers. The grooves are formed in the glass or polymer substrate by etching, grinding, and/or molding. The fiber array is sandwiched between the grooves in the substrate and a complementary cover plate (with or more often without grooves).

Heretofore, for conventional glass, silicon, or polymer fiber array modules, an epoxy adhesive is applied to fix the end sections of the optical fibers under the cover plate to the respective grooves in the substrate by means of application of a heat or UV source to cure the epoxy thereby securing the optical fibers to the substrate. It is known that the diameters of optical fibers could vary on the order of +/−700 nm. The epoxy adhesive also acts as a filler to accommodate to some extent variations in the diameters and/or external circumferential geometry of the optical fibers held in the grooves of the substrate (i.e., the adhesive fills the gap between the exterior surface of an undersized section of an optical fiber and the surfaces of its groove). However, by nature of the epoxy adhesive being a filler, it does not provide a precise reference surface for accurately defining the spatial position of the optical fibers with their optical axis in desired/intended alignment with respect to the grooves. Furthermore, epoxy adhesives are known to deteriorate over time, and their integrity may be compromised during the process in which the end faces of the optical fibers are mechanically polished after the optical fibers are attached in the fiber array module with the end sections of the optical fiber held in the grooves of the substrate.

U.S. Pat. No. 6,219,484 and US2003/0194197A1 disclosed coating the ends of an array of optical fibers and the grooves of a substrate of the fiber array module with solder. The ends of the optical fibers are soldered to the grooves by reflowing the solder with application of heat at the optical fibers and the grooves in the substrate. While these patent publications purportedly overcame some of the drawbacks of using epoxy adhesives to fixedly attach optical fibers in conventional fiber array modules, the disclosed soldering processes involve fabrication processes that add significant fabrication costs and complexity. As disclosed in these patent publications, an underlying metal layer (e.g., a gold layer) is preferably coated on the optical fibers and the grooves prior to coating the solder layers onto the metal layers. The metal coatings on the optical fibers would be by way of metal deposition (usually required to be performed in vacuum chamber) onto the ends of a length of a fiber array cable of a certain length. The soldering process would significantly increase fabrication costs. Reflowing the solder layers on the optical fibers and the grooves could lead to degradations of the integrity and/or properties of the optical fibers and/or the substrate, especially with glass and polymer substrates to allow using a laser heat source to reflow the solder layers. Furthermore, the reflowed solder is essentially also a filler at a gap between the exterior wall of an undersized optical fiber and its adjacent groove surfaces, thus affecting the intended spatial alignment position of the optical axis of the optical fibers with respect to the respective grooves in the substrate of the fiber array module. Hence, these patent publications also share some of the drawback of using epoxy adhesives in convention fiber array modules.

Fiber array modules operating at multi-gigabit rates must be assembled with subcomponents fabricated with sub-micron precision (e.g., a tolerance of less than 1000 nm) to be within alignment tolerances. The current state-of-the-art attempts to achieve stringent alignment tolerances using polymer connector components, but polymers have several fundamental disadvantages. First, they are elastically compliant so that they deform easily under external applied loads. Second, they are not dimensionally stable and can change size and shape especially when subjected to elevated temperatures such as those found in computing and networking hardware. Third, the coefficient of thermal expansion (CTE) of polymers is much larger than the CTE of materials that are commonly used in optoelectronic devices (e.g., photonic integrated circuit (PIC) devices). Therefore, temperature cycles cause misalignment between the optical fibers and the optical elements in the attached optoelectronic devices. In some cases, the polymers cannot withstand the processing temperatures used with soldering processes.

As if producing parts with such high precision levels were not challenging enough, for the resulting end products to be economically and commercially feasible, they must be fabricated using automated, high-speed processes. U.S. Pat. Nos. 7,311,449 and 7,343,770 (the rights to which has have been acquired by Senko Advanced Components, Inc., the common assignee of the present invention) disclosed a ferrule, and a fabrication method thereof, having grooves precision formed by stamping a metal substrate. Subsequent patents of the current assignee disclosed metal optical fiber array modules formed by precision metal stamping, which can be produced by mass production processes with tight tolerances based on the precision metal stamping techniques developed and/or acquired by the current assignee.

What is needed is an improved approach to fixing the optical fibers in the fiber array modules, which improves tolerance, manufacturability and reliability at reduced costs.

SUMMARY OF THE INVENTION

The present invention overcomes the drawbacks of the prior art by providing an optical fiber array module that can accommodate variations in diameters of the optical fibers in the fiber array within anticipated tolerance, to accurately and securely retain the optical fibers in the module without using any solder interface or epoxy interface between the optical fibers and the supporting components (e.g., substrate and cover plate). The fiber array module of the present invention relies on elasto-plastic interfaces for mechanical deformation, as opposed to solder reflow or epoxy curing, to accommodate variations in diameters of the optical fibers in the fiber array.

In one aspect of the present invention, the fiber array module for terminating an array of optical fibers comprises a substrate of a first material having a top surface provided with a plurality of longitudinal open grooves receiving and aligning a longitudinal end section of a corresponding optical fiber in optical alignment to allow light to be transmitted along a defined path, wherein each end section is free of any metal coating predisposed on the end section prior to receiving in the corresponding groove. Hereinafter, the "end section" refers to a longitudinal bare section at the end of a strand of finished optical fiber, at which the protective buffer and jacket layers of the optical fiber strand are removed to expose the cladding surrounding the core of the optical fiber. A cover is attached to the substrate with the optical fibers retained in the groove.

In accordance with the present invention, a layer of a second material defines bottom interfacing portions disposed on the surfaces of the grooves. The second material is softer than the first material. The bottom interface portions interface with bottom contact surfaces of the end sections received in the respective grooves. The cover is of a third material, having a bottom surface facing the top surface of the substrate. A layer of a fourth material defines top interface portions disposed on the bottom surface of the cover. The fourth material is softer than the third material. With the cover attached to the substrate the cover presses on the end sections against the grooves in the substrate, thereby the top interface portions interface with top contact surfaces of the end sections, so as to securely retain the end sections between the cover and the groove. The bottom interface portions and the top interface portions mechanically deform to accommodate the bottom contact surfaces and the top contact surfaces of the respective optical fibers.

In accordance with the present invention, the top interface portions and the bottom interface portions mechanically deform elasto-plastically to form elasto-plastic interfaces between the end sections and the cover and grooves, thereby reducing the effect of variations in the diameters of the end sections on the designed or intended alignment position of the optical axis of the end sections in reference to the substrate. Such elasto-plastic interfaces do not comprise any solder joint interface or reflow solder material, or epoxy joints between the end sections and the cover and grooves.

The initial thicknesses of the top interface portions and the bottom interface portions prior to deformation are chosen to accommodate the anticipated tolerance in variations in diameters of the end sections. The bottom interface portions may be discrete portions or comprised in a continuous layer of the second material across the grooves in the substrate. Similarly, the top interface portions may be discrete portions, or comprised in a continuous layer of the fourth material across the bottom surface of the cover.

In one embodiment, the second material and the fourth material are a similar metal (e.g., gold). In one embodiment, the first material may be one of Invar, Kovar, glass and quartz, or a combination of these materials to form the structure of the substrate.

In one embodiment, the cover is attached to the substrate by a solder joint (or alternatively by an external clip biasing the cover to the substrate to provide biasing of the cover against the end sections supported in the grooves of the substrate). In this embodiment, the third material is optically transparent to an optical radiation source, which would facilitate attachment of the cover to the substrate by reflowing solder (infrared source) or curing epoxy (ultraviolet source). Examples of such optically transparent material are glass, quartz, or even silicon which is transparent to infrared light.

The optical fiber array module of the present invention may be structured to terminate an array of optical fibers in the form of a multi-fiber ferrule for optical coupling, which may be separate or part of an optical connector.

In another aspect, the present invention provides a method of fabricating a fiber array module consistent with the structure of the fiber array module summarized above and further set forth below.

BRIEF DESCRIPTION OF THE DRAWINGS

For a fuller understanding of the nature and advantages of the invention, as well as the preferred mode of use, reference should be made to the following detailed description read in conjunction with the accompanying drawings. In the following drawings, like reference letters and/or numerals designate like or similar parts throughout the drawings.

DETAILED DESCRIPTION OF THE PREFERRED EMBODIMENTS

This invention is described below in reference to various embodiments with reference to the figures. While this invention is described in terms of the best mode for achieving this invention's objectives, it will be appreciated by those skilled in the art that variations may be accomplished in view of these teachings without deviating from the spirit or scope of the invention.

The present invention overcomes the drawbacks of the prior art by providing an optical fiber array module that can accommodate variations in diameters of the optical fibers in the fiber array within anticipated tolerance, to accurately and securely retain the optical fibers in the module without using any solder interface or epoxy interface between the optical fibers and the supporting components (e.g., substrate and cover plate). The fiber array module of the present invention relies on elasto-plastic interfaces for mechanical deformation, as opposed to solder reflow or epoxy curing, to accommodate variations in diameters of the optical fibers in the fiber array. The embodiment is therefore constructed from material that can withstand high operating temperatures since it removes polymers and epoxies that have low glass transition temperature and creep under sustained elevated temperatures.

Figure 1A:
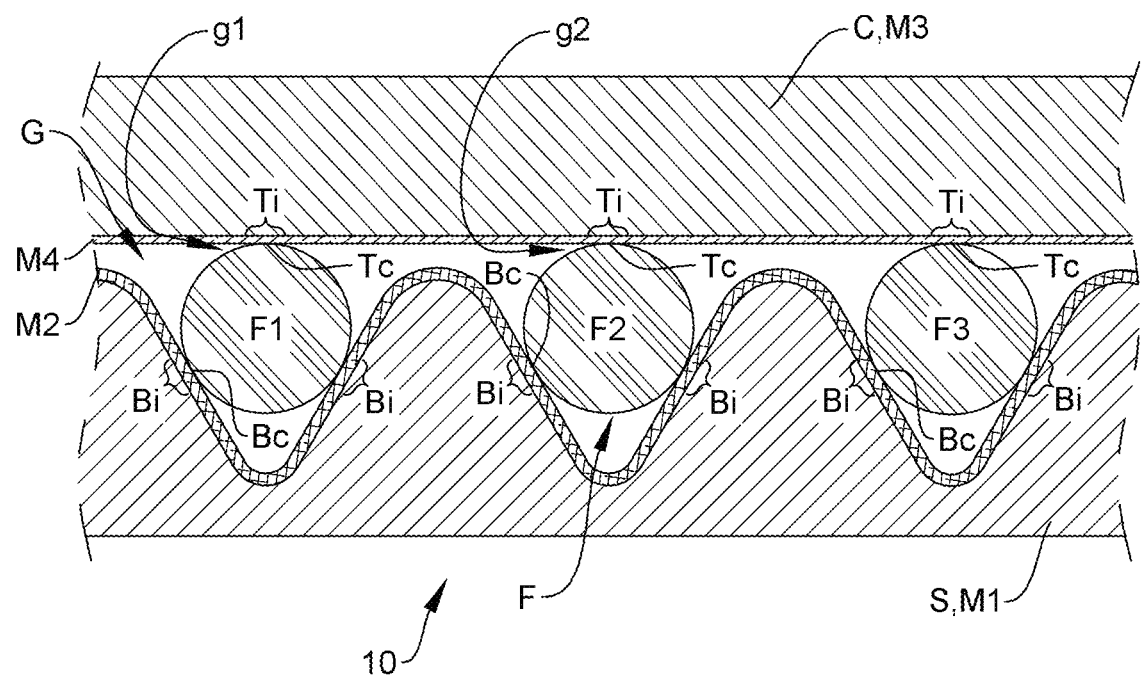
FIGS. 1A and 1B are schematic sectional views of a fiber array module taken along lines 1-1 in FIG. 4, in accordance with one embodiment of the present invention.
Figure 1B:
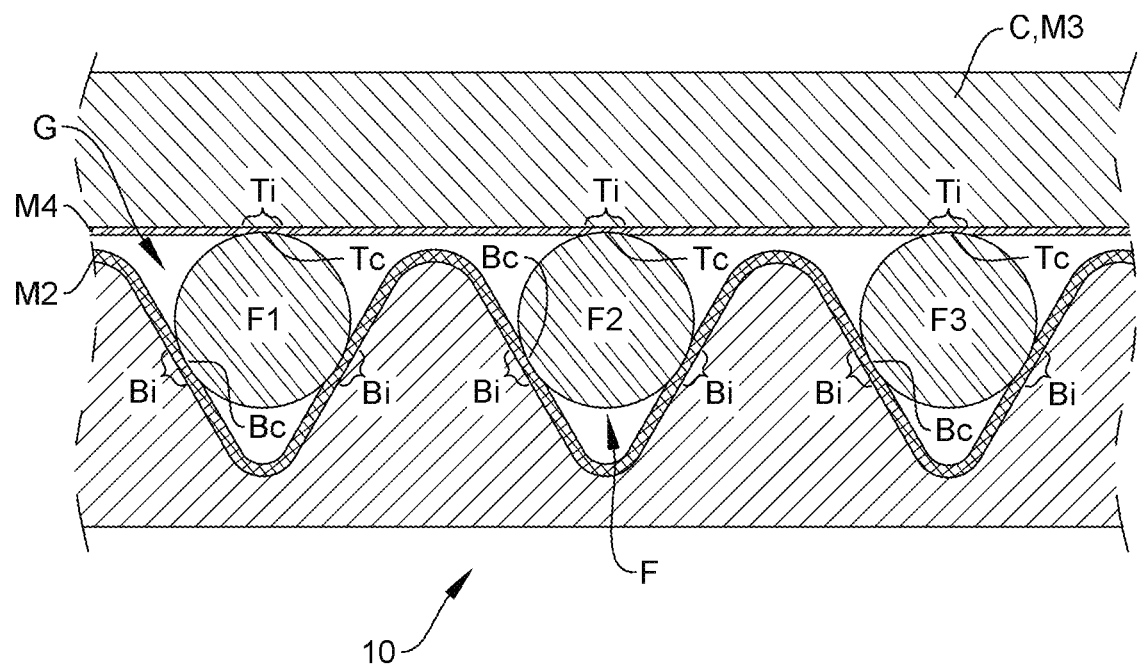
Figure 4:
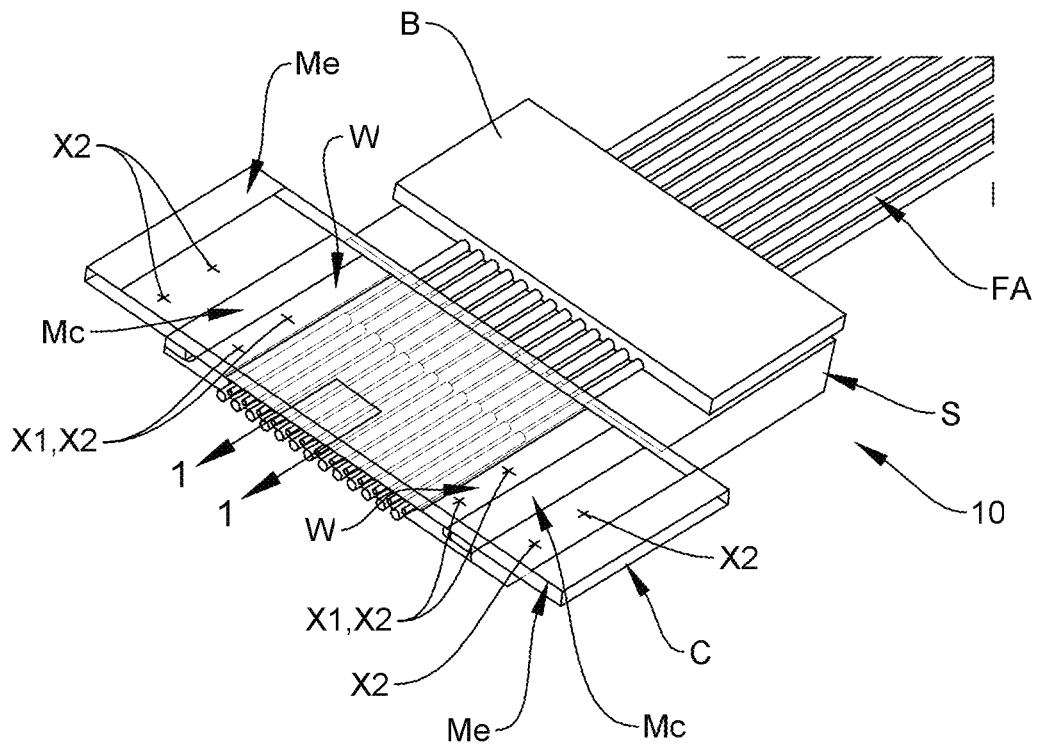
FIG. 4 illustrates the assembly of the cover in FIG. 3 to the substrate in FIG. 2C to form a fiber array module, in accordance with one embodiment of the present invention.

FIGS. 1A and 1B are schematic sectional views of a fiber array module taken along lines 1-1 in FIG. 4, in accordance with one embodiment of the present invention. FIG. 4 illustrates a fiber array module in accordance with one embodiment of the present invention. Referring to the embodiment illustrated in FIG. 4 and the sectional schematic views in FIGS. 1A and 1B, a fiber array module 10 is shown to support an array of optical fibers (or a fiber array FA) for termination. As schematically shown in the sectional views of FIGS. 1A and 1B, the fiber array module 10 comprises a substrate S of a first material M1 having a top surface provided with a plurality of longitudinal open grooves G, which may be have a cross-section that is V-shaped, U-shaped, C-shaped, or hybrid shaped in a combination of two such geometries (e.g., V-shaped with extended vertical sidewalls like in a U-shaped groove). The grooves G are structured and sized to receive a longitudinal end section F of a corresponding optical fiber in optical alignment to allow light to be transmitted along a defined path. As noted earlier, the "end section" refers to a longitudinal bare section F at the end of a set of finished optical fiber in the fiber array F, at which the protective buffer and jacket layers of the optical fiber strand are removed to expose the cladding surrounding the core of the optical fiber at the end section F. Without the soft spongy material of the protective buffer and jacket layers, the bare end section F can be correctly aligned in the fiber array module 10 for optical coupling to an external connection element (e.g., a socket for a connector or ferrule on an optoelectronic device such as a photonic integrated circuit device, etc.). It is important to note that the present invention does not require the end sections to be metalized, such as with a layer of solder material as practiced in the prior art. In the present invention, each end section F is free of any metal coating predisposed on the end section prior to receiving in the corresponding groove G. A cover C (e.g., in the form of a plate) is attached to the substrate with the optical fibers retained in the groove.

In accordance with the present invention, a layer of a second material M2 defines bottom interfacing portions Bi disposed on the surfaces of the grooves G. In the embodiment illustrated in FIGS. 1A and 1B, the bottom interface portions Bi are shown to be comprised in a continuous layer of the second material M2 across the grooves in the substrate S. In an alternate embodiment (not shown), the bottom interface portions Bi may be implemented in discrete portions without the second material M2 covering part of the groove surfaces (e.g., the surfaces at the valleys and/or peaks of the grooves G) that do not directly support the bottom contact surfaces Bc of the end sections F. The bottom interface portions Bi interface with the bottom contact surfaces Bc of the end sections F received in the respective grooves G. The second material M2 is softer than the first material.

The cover C is of a third material M3, having a bottom surface facing the top surface of the substrate. A layer of a fourth material M4 defines top interface portions Ti disposed on the bottom surface of the cover C. In the embodiment illustrated in FIGS. 1A and 1B, the top interface portions Ti are shown to be comprised in a continuous layer of the fourth material M4 across the bottom surface of the cover C. In an alternate embodiment (not shown), the top interface portions Ti may be implemented in discrete portions without the fourth material M4 covering part of the bottom surface of the cover C which does not directly press on the top contact surfaces Tc of the end sections F. The fourth material M4 is softer than the third material. With the cover C attached to the substrate S with an external clamping force, the cover C presses on the end sections F against the grooves G in the substrate S, whereby the top interface portions Ti interface with top contact surfaces Tc of the end sections F, to securely retain the end sections between the cover C and the substrate S.

Referring more closely to FIG. 1A, the bottom interface portions Bi and the top interface portions Ti mechanically deform to accommodate the bottom contact surfaces Bc and the top contact surfaces Tc of the respective end sections F (e.g., F1, F2, F3). As exemplarily illustrated, the end sections F1, F2 and F3 have slightly different diameters within tolerance. In particular, the end section F2 has a normal diameter, the end section F1 has a slightly smaller diameter, and the end section F3 has a slightly larger diameter. When the cover C is initially placed squarely above the end sections F1, F2 and F3, the top contact surface Tc of the end section F3 will be in contact with its corresponding top interface portion Ti. There is a small gap g1 between the top contact surface Tc of the end section F2 and its corresponding top interface portion Ti, and there is a slightly larger gap g2 between the top contact surface Tc of the end section F1 and its corresponding top interface portion Ti.

Referring to FIG. 1B, upon clamping the cover C onto the substrate S, the softer top interface portions Ti and the bottom interface portions Bi mechanically deform elasto-plastically against the end sections F1, F2 and F3, resulting in closing of the gaps g1 and g2 followed by further deforming the top interface portions Ti after closing of the gaps g1 and g2. The extent of deformation is largest for the top interface portions Ti and bottom interface portions Bi corresponding to the end section F3. Elasto-plastic interfaces are thus formed between the end sections F1, F2 and F3 and the cover C and grooves G. The extent of deformation at each elasto-plastic interface (i.e., the extent of deformation of the softer top interface portions Ti and the softer bottom interface portions Bi) would depends on the size of the end sections F. As illustrated, the deformation of the top interface portions Ti and the bottom interface portions Bi corresponding to the end section F2 is slightly smaller than that corresponding for the end section F3. The extent of deformation of the top interface portions Ti and the bottom interface portions Bi corresponding to the end section F1 is slightly smaller than that corresponding for the end section F2. Hence, in the illustrated example, the extent of deformation at the elasto-plastic interfaces has an inverse relationship to the size of the end sections F1, F2 and F3.

Several benefits can be achieved as a result of the elasto-plastic interfaces caused by deformation of the soft top and bottom interface portions Ti and Bi. The interfaces hold the end sections F into position, accommodate fiber end section variations, and clamp the end sections F for secured retention in the grooves G. As shown in FIG. 1B, three elasto-plastic interfaces are formed at the three points of contact for each end section (F1, F2, F3) in the corresponding groove (i.e., between the single top interface portion Ti and the single top contact surface Tc for each of the end sections F1, F2 and F3, and between the two bottom interface portion Bi and the two bottom contact surfaces Bc for each of the end sections F1, F2 and F3). The three elasto-plastic interfaces result in centering of the end sections F1, F2 and F3 within the grooves G to maintain the center of the respective end sections, and hence the nominal alignment position of optical axis of the end sections, thereby reducing the effect of variations in the diameters of the end sections F1, F2 and F3 on the designed or intended nominal alignment position of the optical axis of the end sections F1, F2 and F3 in reference to the substrate S. Such elasto-plastic interfaces do not comprise any reflowed solder joint interface or epoxy joint interface between the end sections F and the cover C and grooves G, thus avoiding the drawbacks of the prior art mentioned in the Background section. It is further noted that the elasto-plastic interfaces distribute pressure at such interfaces to avoid the pressure points associated with direct point contacts (in cross section) between the ends sections F and surfaces of grooves G and cover C that do not include interface portions Ti and Bi.

Ideally, if the end sections F have the same diameter without variation among them, the extent of deformation at the three elasto-plastic interfaces (i.e., deformation of the two softer bottom interface portions Bi and the two top interface portions Ti for each end sections F) would be the same. Conceivably in this ideal situation with no variation in optical fiber diameter, at the three elasto-plastic interfaces, the single top contact surface Tc and the two bottom contact surfaces Bc of each end section would eventually bottom out to contact the sidewalls of the groove G and the bottom surface of the cover C.

The bottom interface portions Bi have an initial thickness prior to receiving the end sections, and the top interface portions Ti have an initial thickness prior to the cover pressing onto the end sections F. The initial thickness of the bottom interface portions Bi and the initial thickness of the top interface portions Ti are determined and sized to allow for mechanical deformation (i.e., elasto-plastic deformation) to accommodate anticipated tolerance in variations in the diameters of the end sections F, as discussed above.

In one embodiment, the initial thicknesses of the top interface portions Ti and the bottom interface portions Bi prior to deformation are chosen to be on the order of 200 nm to 10 microns to accommodate the anticipated tolerance of up to +/−700 nm in variation in the diameters of the end sections F In one embodiment, the second material M2 and the fourth material M4 are of a similar metal. In one embodiment, the second and fourth materials M2 and M4 are gold. In one embodiment, the first material M1 may be one of Invar, Kovar, glass, quartz, or a combination of these materials to form different parts of the structure of the substrate.

In one embodiment, as will be explained in connection with FIGS. 2 to 4 below, the cover C is attached to the substrate S by a solder joint or a weld joint (or alternatively, not shown, by an external clip biasing the cover to the substrate, which could be useful for field termination of a fiber array). In this embodiment, the third material M3 (e.g., glass or quartz) is chosen to be optically transparent to an optical radiation heat source (e.g., a laser), which would facilitate attachment of the cover to the substrate by reflowing solder or welding, to be discussed below.

In a further embodiment, after the cover is attached to the substrate, an epoxy material may be introduced to fill the spaces around the end section F (i.e., between the end sections F and the bottom surface of the cover C and the sidewall surfaces of the grooves G). In this case, the epoxy material acts purely as a filler to reinforce the bare end sections (e.g., for subsequent cleaving/polishing procedures) and not for attaching the cover C to the substrate S. The epoxy stiffens the fibers in the grooves making it possible to mechanically polish the endface of the end sections. In this case, the epoxy fills the gaps but doesn't shift fibers because they are already retained in place by the elasto-plastic clamping of the end sections F by the groove G and cover C.

The optical fiber array module 10 of the present invention may be structured to terminate an array of optical fibers FA in the form of a multi-fiber ferrule for optical coupling, which may be separate part or part of an optical connector.

The Assignee of the present invention, Senko Advanced Components, Inc., acquired and developed technologies directed to various proprietary optical coupling/connection devices having stamped metal components (e.g., metallic optical benches having fiber grooves) used in connection with optical data transmission. The structures and processes disclosed in Assignee's prior patent publications may be adopted to produce the fiber array module disclosed herein.

For example, U.S. Pat. Nos. 7,311,449 and 7,343,770 discloses a novel precision stamping system for manufacturing small tolerance parts and a ferrule produced thereby. U.S. Pat. No. 10,754,107 further discloses more specifically an optical coupling device having a stamped structured surface for routing optical data signals, in particular an optical coupling device for routing optical signals, including a base/substrate; and an alignment structure comprising grooves defined on the base, configured with a surface feature to facilitate positioning an optical component on the base in optical alignment to allow light to be transmitted along a defined path, wherein the alignment structure is integrally defined on the base by stamping a malleable material of the base. Subsequent patents of the current Assignee disclosed metal optical fiber array modules formed by precision metal stamping, which can be produced by mass production processes with tight tolerances based on the precision metal stamping techniques developed and/or acquired by the current Assignee.

The present invention is more specifically directed to optical fiber array modules, while adopting similar concept of precision stamping metal components including precision stamped grooves in the earlier optical coupling devices. The above disclosures can be implemented in various stamping processes to produce the structures disclosed herein (including the structures for the substrate S discussed above. These stamping processes involve stamping a bulk material (e.g., a metal blank or stock), to form the final surface features (namely, the fiber end section alignment grooves G) at tight (i.e., small) tolerances in precise alignment with the other defined surface features (in this case, the relative position and orientation of the parallel arrangement of grooves G for the array of fiber end sections).

U.S. Pat. No. 9,897,769 commonly assigned to the current Assignee further discloses a vision-based passive alignment approach to optically couple input/output of optical fibers in optical alignment to external optical devices. an optically transparent alignment block is implemented to physically and optically couple an optical bench supporting end section of an optical fiber to the external optical device on a submount. The optically transparent alignment block having a first set of optical fiducials for aligning optical fiducials defined on the optical bench with the alignment block, and a second set of optical fiducials for aligning the alignment block with optical fiducials defined on the optical device or the submount, without relying on an additional physical alignment structure. U.S. Pat. No. 11,022,755 commonly assigned to the current Assignee further rely on this vision-based passive alignment approach in connection with optically aligning a edge optical coupler for demountable connection to a photonic integrated circuit. This vision-based passive alignment approach can be similarly implemented in the present invention, with the cover C being the optically transparent alignment block having the two sets of optical fiducials, to physically and optically align the ends sections F to the external optical device, without relying on any additional physical alignment structure, as further discussed below.

In another aspect, the present invention provides a method of fabricating/assembling a fiber array module consistent with the structure of the fiber array module 10 discussed above in connection with FIGS. 1A, 1B and 4.

Figure 2A:
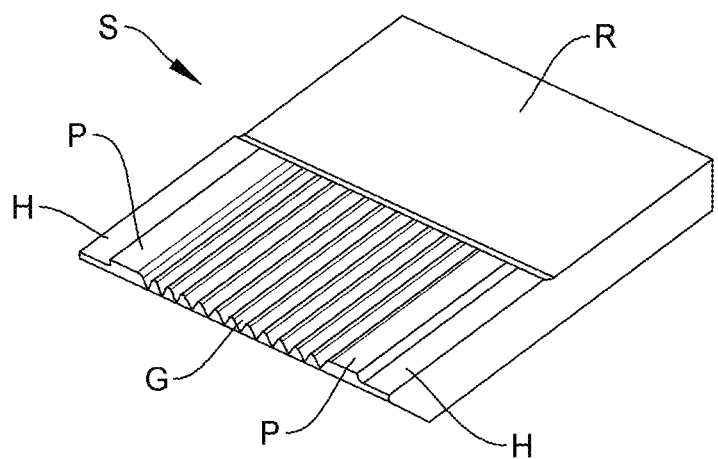
FIGS. 2A-2C illustrate a substrate of the fiber array module at various stages of preparation for attachment of a cover, in accordance with one embodiment of the present invention.
Figure 2B:
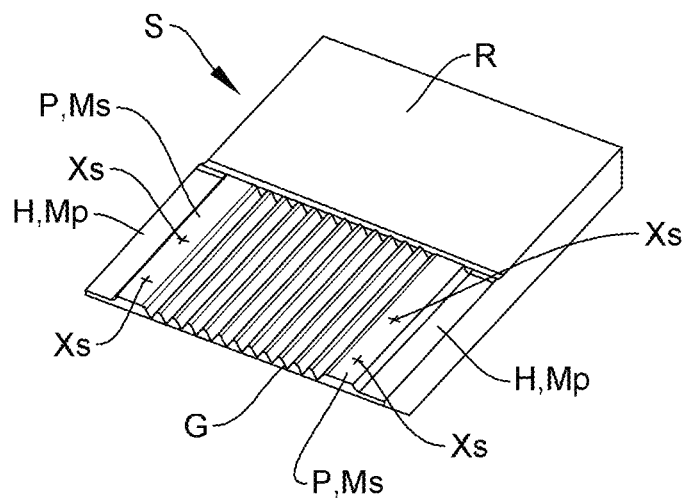
Figure 2C:
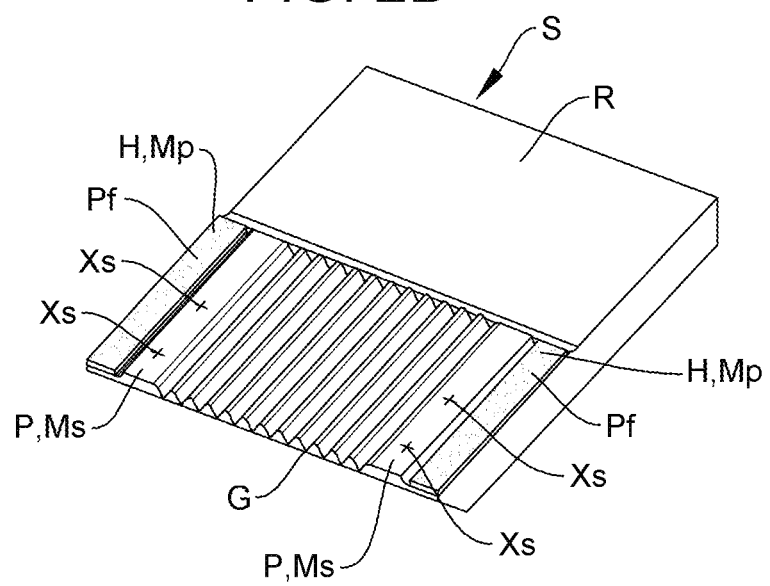

FIGS. 2A-2C illustrate an embodiment of a substrate S (e.g., of Kovar, Invar, etc.) at various stages of preparation for attachment to a cover C, to complete the assembly of the fiber array 10 as shown in FIG. 4. The substrate S has a body having a top surface preformed with the features shown, as further discussed below. An array of fiber alignment grooves G is formed on the top surface of the substrate, corresponding to the number of end sections F of the array of optical fibers FA. On each side of the array of grooves G, a shoulder H is formed by a planar alignment pad P. In FIG. 2B, a thin layer of plated soft and solderable material Ms (e.g., nickel and gold plating) is formed on the alignment pads P. A set of optical fiducials Xs is formed on the layer of material Ms, for alignment of the substrate S to the cover/plate C acting as a visual alignment block, as further discussed below. The grooves G that defines the end sections F are precisely positioned with respect to the optical fiducials Xs on the substrate S, by simultaneously and integrally stamping the grooves G and the fiducials Xs, with at least the final shape and geometry of the grooves G and the fiducial Xs formed simultaneously in a single metal stamping step to accurately define the relative positions of the grooves G (and hence the end sections F) and fiducial Xs. Reference is made to the current Assignee's patents noted above which disclose metal stamping, in particular U.S. Pat. No. 11,022,755.

A recess R is provided on the top surface of the substrate, to accommodate the thicker sections of the array of optical fibers FA which have the protective layers. The recess does not need to be provided with high alignment tolerance with respect to the end sections F.

A thin prime metal layer (e.g., gold) Mp is coated on each alignment pad P, prior to disposing a solder preform Pf (e.g., a gold/tin) on each shoulder H, as shown in FIG. 2C. The solder preform Pf is used for sealing with the cover C (as further disclosed below). In another embodiment, the solder preform Pf may be replaced with a coating having a heat absorbing layer on the underlying gold prime layer Mp, for facilitate laser soldering by applying localized pinpoint heating from a laser through the transparent cover C.

Figure 3:
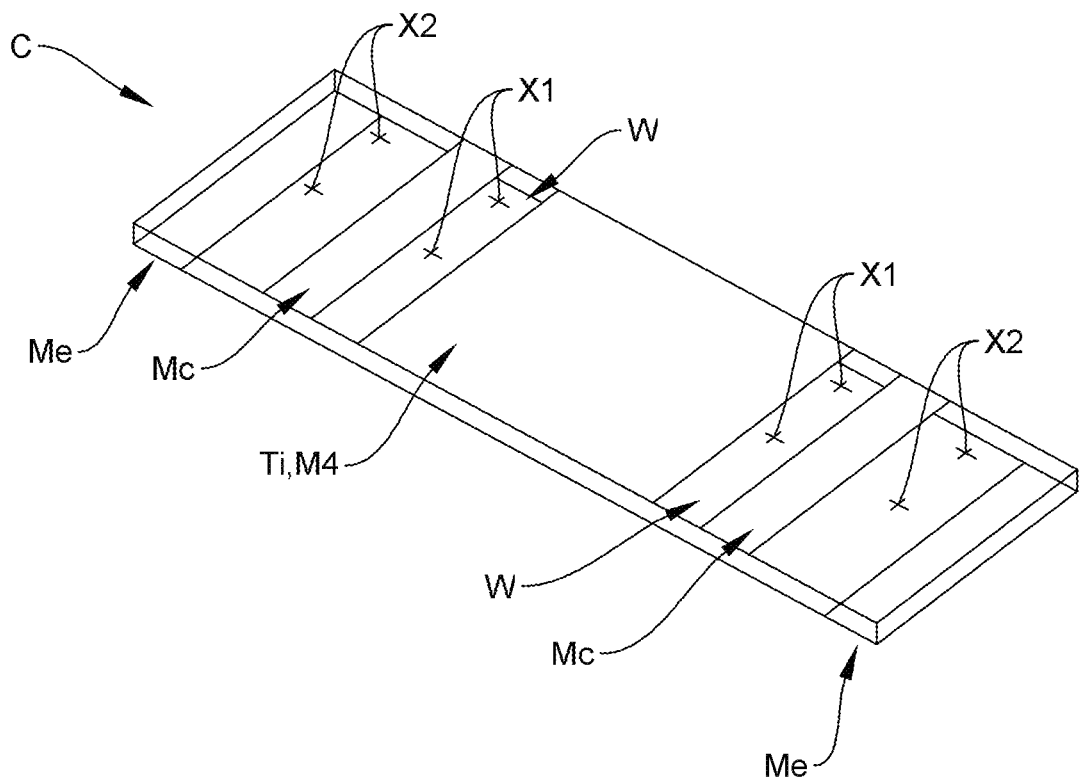
FIG. 3 illustrates a cover, in accordance with one embodiment of the present invention.

FIG. 3 illustrates a cover C in the form of an optically transparent plate, in accordance with one embodiment of the present invention. In this illustrated embodiment, the cover C is a glass plate. Other optical transparent material, such as quartz, could be the material for the cover C. The cover C can also be made of metal, such as Kovar, Invar, etc.

The bottom surface of the cover C is shown facing upwards in FIG. 3. In this embodiment, the middle section of the bottom surface is coated with a layer of metal M4 (e.g., gold) softer than the material M3 of the cover S (e.g., glass) corresponding to the top interface portions Ti discussed above in connection with FIG. 1. In the illustrated embodiment, a softer and solderable material Mc (e.g., gold) is deposited on the bottom surface at locations corresponding to the solder preform Pf on the substrate S shown in FIG. 2C. If the layers of materials Mc and M4 are chosen to be the same material (e.g., gold), a single layer can be deposited to cover the M4 section for the top interface portions Ti and the Mc section of the bottom surface.

It is noted that in the case of a glass cover C, the sections W of the bottom surface of the cover C corresponding to the alignment pads P should be left uncoated by the metal layer, to provide a window to allow for visual alignment discussed below. A first set of optical fiducials X1 is provided at the section V, e.g., by laser etching the glass material of the cover C, evaporating metal onto the cover C using a masking process, or printing to form a marking. The fiducials X1 correspond to the complementary fiducials Xs on the alignment pads P. As illustrated, on the top surface of the cover C (shown facing downwards in FIG. 3), another second set of optical fiducials X2 is provided for alignment and mounting to an external structure (e.g., an external printed circuit board, a PIC chip, etc.). The fiducials X2 correspond to complementary fiducials provided on the external structure. The relative positions of the first and second sets of fiducials on the cover C are predetermined in relation to the grooves via the set of fiducials Xs on the alignment pads P of the substrate. Hence, the first and second set of fiducials X1 and X2, the set of fiducials Xs and the grooves are in a desired alignment relationship, such that optical signals from the end sections F can follow an optical path in optical alignment to the optical device (e.g., a PIC)/external structure.

On the top surface of the cover C, a narrow section along each of the opposite edges is metalized with a soft and solderable material Me (e.g., gold), for joining to the external structure via soldering. The narrow sections of material Me do not obscure the alignment fiducials X2 on the top surface of the cover C.

In FIG. 4, after placing the end sections F in the corresponding grooves G, the cover Cis placed over the top surface of the substrate S with the bottom surface of the cover C facing the substrate S. A plate acting as a clamping bar B is attached to the substrate over the recess region to reinforce fiber cable retention on the fiber array module 10. Through the window W of the cover C, the set of fiducials X1 on the cover C is visually aligned with the fiducials Xs on the alignment pads P on the substrate S. Pressure is applied to the cover C to clamp or press the cover C against the substrate, to effect the elasto-plastic deformation discussed above in connection with FIGS. 1A and 1B. An optical radiation heat source (e.g., a laser) is applied through the top surface of the optically transparent cover C to melt the solder preforms Pf between the section of material Mc and the material Mp on the alignment pads P, thus permanently joining the cover C to the substrate S. This localized pinpoint heating of the solder prefoms Pf would not affect the integrity of the end sections F.

As depicted in FIG. 4, the end sections F protrude slightly out from the endface of the substrate S. In a further embodiment, the protruded sections can be cleaved and/or polished to achieve the desired angle and shape at the endface of each end sections F, and to make the fiber endfaces coplanar to substrate endface. To reinforce the end sections F during mechanical or laser cleaving polishing procedures, after the cover C is attached to the substrate S, an epoxy material is introduced to fill the spaces around the end sections F, that are between the end sections F and the bottom surface of the cover C and the sidewall surfaces of the grooves G. In this case, the epoxy material acts purely as a filler to reinforce the bare end sections (e.g., for subsequent cleaving/polishing procedures) and not for attaching the cover C to the substrate S.

Figure 5:
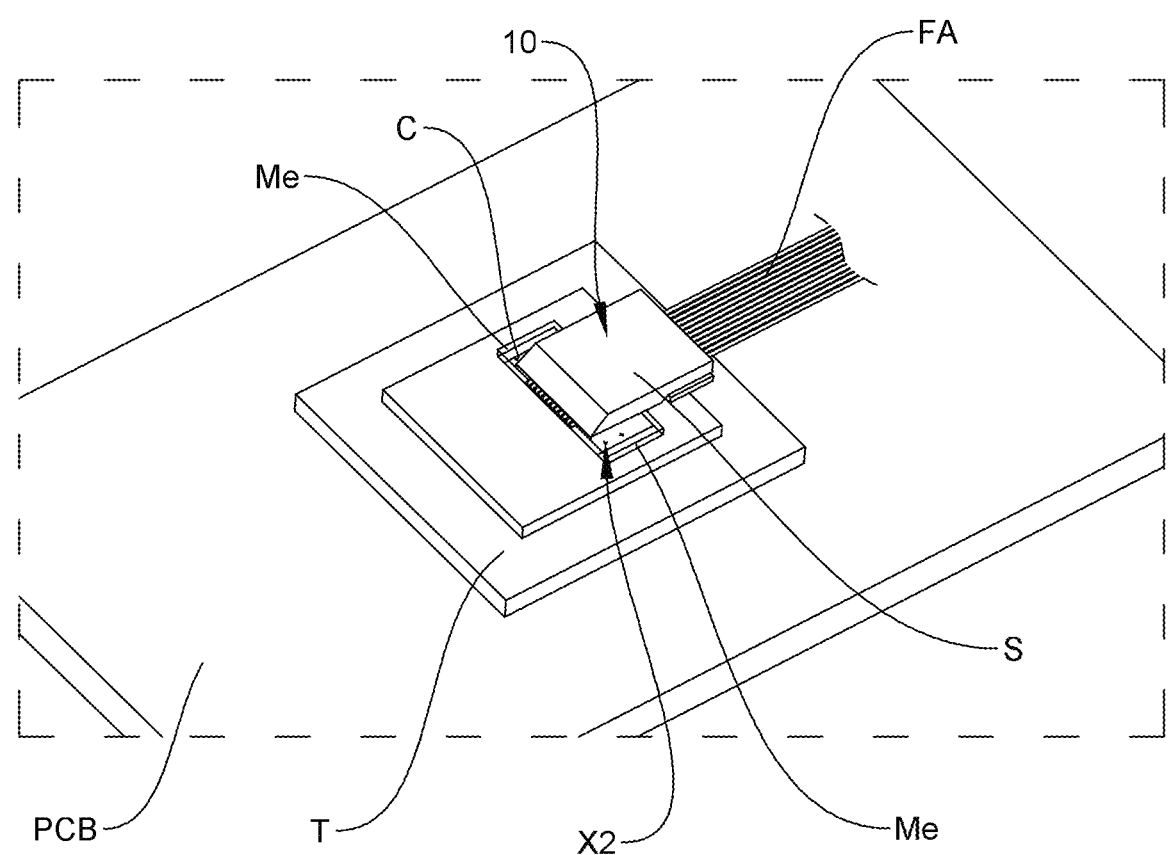
FIG. 5 illustrates the fiber array module attached to a photonic integrated circuit (PIC) chip, in accordance with one embodiment of the present invention.
Figure 6A:
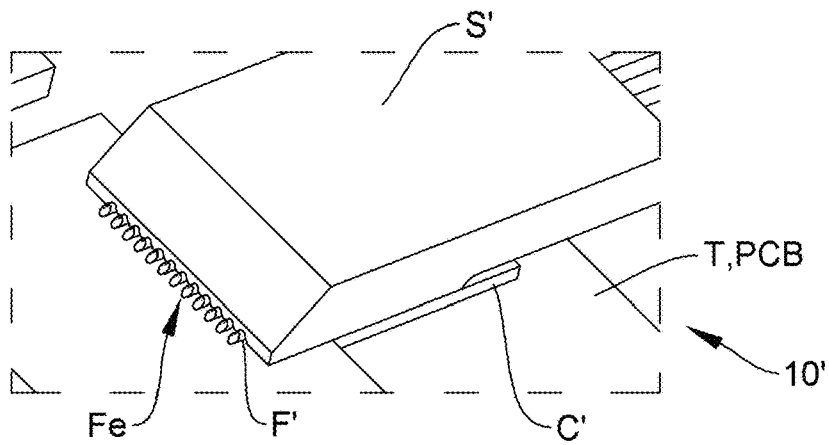
FIGS. 6A-6D illustrate a fiber array module in accordance with another embodiment of the present invention.
Figure 6B:
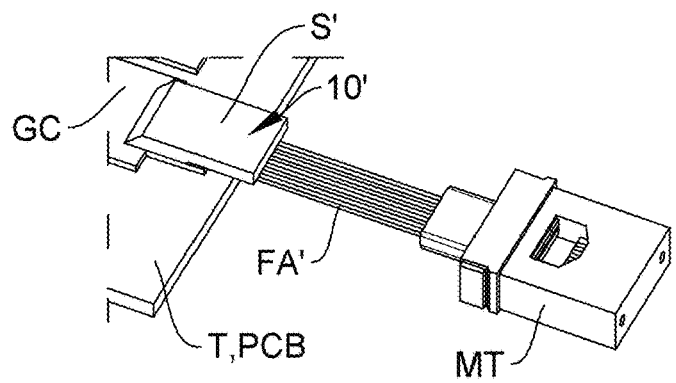
Figure 6C:
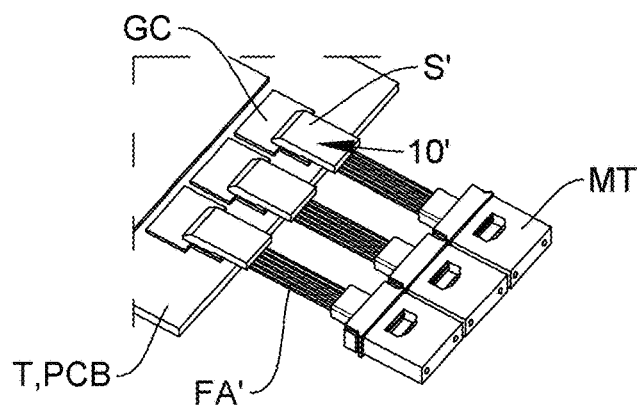
Figure 6D:
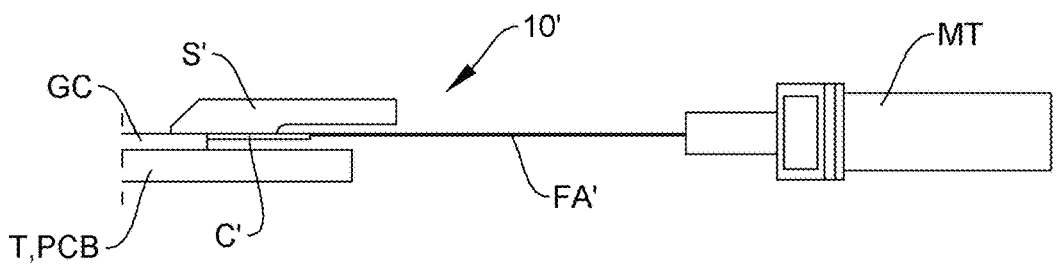

FIG. 5 illustrates the fiber array module 10 attached to a photonic integrated circuit chip PIC, in accordance with one embodiment of the present invention. As illustrated, the PIC is mounted on an interposer T on a printed circuit board PCB. The top surface of the PIC has a set of optical fiducials in alignment with its optical devices onboard. The fiber array module 10 is optically aligned and mounted to the top surface of the PIC, by visually aligning the set of fiducials X2 on the top surface of the cover C to the complementary fiducials on the PIC. After achieve optical alignment, the metalized sections of material Me can be used to solder (e.g., using a laser) the fiber array module 10 to the PIC to maintain the aligned position of the fiber array module on the PIC.

In the illustrated embodiment in FIG. 3, the cover C extends wider than the substrate S. Referring also to FIG. 4, the cover C extends beyond the opposing sides of the substrate S, to allow for visual alignment and attachment to an external structure. If no visual alignment and/or laser soldering/welding is required, the cover C does not need to extend beyond the opposing sides to the substrate S to provide for the second set of fiducials X2 and the sections with material Me.

FIGS. 6A-6D illustrate a fiber array module 10' in accordance with another embodiment of the present invention. In the illustrated embodiment, the fiber array module 10' is attached to a grating coupler GC, without using visual alignment and laser soldering in the prior embodiment. Alignment of the fiber array module 10' on the grating coupler GC can be achieved by an active alignment procedure, by reading the optical signals transmitted via the fiber array module 10'. As illustrated, the fiber array FA' is provided with an MT ferrule (MT) that can be used in a fiber-optic connector such as the common MTP/MPO style connectors for signal accessing the fiber array module 10'.

In this embodiment, the fiber array module 10' comprises a substrate S' and a cover C' supporting faceted end sections F' preformed (e.g., by cleaving) with endfaces Fe at an angle (e.g., 45-degree angle) for optically coupling to the grating coupler GC. The structure of the substrate S is substantially similar to the substrate S in the previous embodiment depicted in FIGS. 2A to 2C, except that the set of alignment fiducials Xs, X1 and X2 may be omitted, as the cover C' does not act as an alignment block. The cover C' and/or the substrate S' may include locating indicia for general placement of the cover C' over the substrate S', but the cover C' does not need to be aligned to the substrate S' with the same level of accuracy required for the cover C and substrate S in the previous embodiment. Otherwise, the cover C' in this embodiment shares the same coating of materials Mc and M4 on the bottom surface of the cover C in the previous embodiment. Given there is no fiducials X1 in this embodiment, the window W is not required for this embodiment. The cover C' does not extend as much as the cover C in the previous embodiment, as the section for the set of fiducials X2 is no longer required. Similar solder material Me (e.g., Gold/Tin) is provided on the bottom surface of the cover C' at the sections near along the opposing edges, as was in the previous embodiment, except that the cover does not extend beyond the sides of the substrate S' in this embodiment.

Solder preforms Pf are provided on shoulders H in a similar fashion as was in the case of substrate S in the previous embodiment. The cover C' is attached to the substrate S' by applying a laser to reflow the solder preforms Pf after installing the end sections F' and pressing the cover C' onto the substrate S' to achieve elasto-plastic deformation discussed above.

In this embodiment, the substrate S' is also made of metal (e.g., Kovar or Invar), and Given the endfaces Fe of the sections F' are preformed with the desired angle, no post assembly procedure on the end sections F' as held by the fiber array module 10' is required. Hence, no epoxy filler material is required to be used to fill the voids around the end sections F'. In the absence of low glass transition temperature epoxy materials, the fiber array module 10' could be subject to heat to reflow the solder material Me to attach the cover C' to the grating coupler GC after active alignment procedure. In this regard, it is noted that the solder preform Pf melts at a reflow temperature (e.g., 280 degree C.), but after reflowing and re-solidifying, the crystal structure of the preform material changed to require a higher melting temperature for subsequent reflow of the re-solidified solder material. This allows the fiber array module 10' to be subject to heat to reflow the solder material Me at a reflow temp (e.g., 280 degree C.) lower than the now higher melting temperature of the re-solidified material at the solder reform joint previously formed between the cover C' and substrate S'. Hence, the integrity of the solder reform joint would not be affected by the subsequent reflowing of the solder material Me. This reflow procedure simplifies attachment of the fiber array module 10' to the external mounting structure (in this case, a grating coupler GC), as multiple fiber array modules 10' and grating couplers GC shown in FIG. 6C can be subject to heating simultaneously without localized pinpoint heating, thus increasing throughput in manufacturing.

Some of the benefits of the metallic fiber array modules of the present invention include: (a) the modules are relatively easily customizable with different groove sizes, channel counts, pitch distances and using alternative metals; (b) the modules are laser weldable and solderable to the metal frame and/or board, with no brittle fracture or cracking; (c) the modules are machinable for different frame shape and geometry; and (d) scalable for high volume production.

While the invention has been particularly shown and described with reference to the preferred embodiments, it will be understood by those skilled in the art that various changes in form and detail may be made without departing from the spirit, scope, and teaching of the invention. Accordingly, the disclosed invention is to be considered merely as illustrative and limited in scope only as specified in the appended claims.

We claim:

1. An optical fiber array module for terminating an array of optical fibers, comprising:
    a substrate of a first material having a top surface with a groove region provided with a plurality of longitudinal open grooves receiving and aligning a longitudinal end section of a corresponding optical fiber in optical alignment to allow light to be transmitted along a defined path, wherein each end section is free of any metal coating predisposed on the end section prior to receiving in the corresponding groove;
    a layer of a second material defining bottom interface portions disposed on surfaces of the grooves, wherein the second material is softer than the first material, wherein the bottom interface portions interface with bottom contact surfaces of the end sections received in the respective grooves;
    a layer of a solder preform material disposed on the top surface of the substrate outside the groove region to define bottom solder regions;
    a cover of a third material that is optically transparent to an optical radiation source and having a bottom surface facing the top surface of the substrate, wherein the cover is attached to the substrate with the optical fibers retained in the grooves;
    a layer of a fourth material defining top interface portions disposed on the bottom surface of the cover, wherein the fourth material is softer than the third material, wherein with the cover attached to the substrate the cover presses on the end sections against the substrate and the top interface portions interface with top contact surfaces of the end sections, so as to securely retain the optical fibers therebetween, and wherein the bottom interface portions and the top interface portions mechanically deform to accommodate the bottom contact surfaces and the top contact surfaces of the respective optical fibers; and a layer of a fifth material that is solderable, defining top solder regions facing corresponding bottom solder regions, disposed outside the top interface portions on the bottom surface of the cover, wherein the solder preform material at the bottom solder regions of the substrate faces the fifth material at the top solder regions of the cover, and wherein the cover is soldered to the substrate, comprising heat reflowing the solder preform material at the bottom solder regions onto the fourth material at the top solder regions by radiation from the optical radiation source through the optically transparent third material of the cover.

2. The optical fiber array module as in claim 1, wherein the third material of the cover comprises one of glass, quartz and silicon, which is optically transparent to infrared radiation.

3. The optical fiber array module as in claim 2, wherein the optical radiation source comprises a laser.

4. The optical fiber array module as in claim 3, wherein the fifth material is a metal, which metalizes the cover at the top solder regions.

5. The optical fiber array module as in claim 4, wherein the fourth material and the fifth material are of a same metal.

6. The optical fiber array module as in claim 5, wherein the same metal is gold.

7. The optical fiber array module as in claim 6, wherein the first material comprises at least one of metal, glass and quartz.

8. The optical fiber array module as in claim 1, further comprising epoxy filling spaces between the end sections and the bottom of the cover and the surfaces of the grooves of the substrate after the cover is attached to the substrate.

9. The optical fiber array module as in claim 1, wherein the top interface portion and the bottom interface portions form elasto-plastic interfaces that do not comprise any solder joint interface or any reflow solder material.

10. The optical fiber array module as in claim 1, wherein the bottom interface portions comprise discrete portions or are comprised in a continuous layer of the second material across the grooves in the groove region of the substrate, and wherein the top interface portions comprise discrete portions and are separate from the top solder regions or the top interface portions and the top solder regions are comprised in a continuous layer of a same material across the top interface portions and the top solder regions at the bottom surface of the cover.

11. A method of terminating an array of optical fibers with an optical fiber array module, comprising:

providing a substrate of a first material having a top surface with a groove region provided with a plurality of longitudinal open grooves receiving and aligning a longitudinal end section of a corresponding optical fiber in optical alignment to allow light to be transmitted along a defined path, wherein each end section is free of any metal coating predisposed on the end section prior to receiving in the corresponding groove;

disposing a layer of a second material defining bottom interface portions on surfaces of the grooves, wherein the second material is softer than the first material, wherein the bottom interface portions interface with bottom contact surfaces of the end sections received in the respective grooves;

disposing a layer of a solder preform material on the top surface of the substrate outside the groove region to define bottom solder regions;

providing a cover of a third material that is optically transparent to an optical radiation source and having a bottom surface facing the top surface of the substrate, wherein the cover is attached to the substrate with the optical fibers retained in the grooves;

disposing a layer of a fourth material defining top interface portions on the bottom surface of the cover, wherein the fourth material is softer than the third material, wherein with the cover attached to the substrate the cover presses on the end sections against the substrate and the top interface portions interface with top contact surfaces of the end sections, so as to securely retain the optical fibers therebetween, and wherein the bottom interface portions and the top interface portions mechanically deform to accommodate the bottom contact surfaces and the top contact surfaces of the respective optical fibers; and disposing a layer of a fifth material that is solderable outside the top interface portions on the bottom surface of the cover to define top solder regions facing corresponding bottom solder regions, wherein the solder preform material at the bottom solder regions of the substrate faces the fifth material at the top solder regions of the cover, and wherein the cover is soldered to the substrate, comprising heat reflowing the solder preform material at the bottom solder regions onto the fourth material at the top solder regions by radiation from the optical radiation source through the optically transparent third material of the cover.

12. The method as in claim 11, wherein the third material of the cover comprises one of glass, quartz and silicon, which is optically transparent to infrared radiation.

13. The method as in claim 12, wherein the optical radiation source comprises a laser.

14. The method as in claim 13, wherein the fifth material is a metal, which metalizes the cover at the top solder regions.

15. The method as in claim 14, wherein the fourth material and the fifth material are of a same metal.

16. The method as in claim 15, wherein the same metal is gold.

17. The method as in claim 16, wherein the first material comprises at least one of metal, glass and quartz.

18. The method as in claim 11, further comprising epoxy filling spaces between the end sections and the bottom of the cover and the surfaces of the grooves of the substrate after the cover is attached to the substrate.

19. The method as in claim 11, wherein the top interface portion and the bottom interface portions form elasto-plastic interfaces that do not comprise any solder joint interface or any reflow solder material.

20. The method as in claim 11, wherein the bottom interface portions comprise discrete portions or are comprised in a continuous layer of the second material across the grooves in the groove region of the substrate, and wherein the top interface portions comprise discrete portions and are separate from the top solder regions or the top interface portions and the top solder regions are comprised in a continuous layer of a same material across the top interface portions and the top solder regions at the bottom surface of the cover.

* * * * *